United States Patent [19]

Geissler

[11] Patent Number: 5,267,766
[45] Date of Patent: Dec. 7, 1993

[54] TOOL GRIPPER

[75] Inventor: Alfred Geissler, Pfronten-Halden, Fed. Rep. of Germany

[73] Assignee: Maho Aktiengesellschaft, Pfronten, Fed. Rep. of Germany

[21] Appl. No.: 938,839

[22] Filed: Sep. 1, 1992

[30] Foreign Application Priority Data

Sep. 9, 1991 [DE] Fed. Rep. of Germany ....... 9111159

[51] Int. Cl.$^5$ .................. B23Q 3/155; B66C 1/42
[52] U.S. Cl. ................... 294/116; 294/115; 414/618; 483/49
[58] Field of Search ............ 294/86.4, 86.41, 106, 294/115, 116; 414/618, 739, 744.3, 744.8; 483/30, 36, 38, 49

[56] References Cited

U.S. PATENT DOCUMENTS

| 4,041,601 | 8/1977 | Schimanski | 483/49 X |
| 4,299,532 | 11/1981 | Bouwmeester | 294/116 X |
| 4,372,728 | 2/1983 | Murakami | 414/744.3 X |
| 4,845,835 | 7/1989 | Schneider | 483/49 |
| 4,879,802 | 11/1989 | Winkler et al. | 294/116 X |
| 5,070,592 | 12/1991 | Sugata | 483/30 X |
| 5,142,766 | 9/1992 | Wehrmeister | 294/116 X |

Primary Examiner—David M. Mitchell
Assistant Examiner—Dean J. Kramer
Attorney, Agent, or Firm—Weingarten, Schurgin, Gagnebin & Hayes

[57] ABSTRACT

A tool gripper to remove a tool from and position the tool in a work spindle or a tool magazine, respectively, includes two tong-like gripper arms, a support attached to a tool changer on which the two gripper arms are mutually movably mounted, and an operating device to open and close the two gripper arms. To achieve a simple construction with only a few individual parts, and to avoid technically complicated hydraulic or pneumatic driving mechanisms, according to the invention a first spring is disposed between the two gripper arms to provide a closing force. Further, the support having a bore therein, is motor-driven and movably arranged on a column. A pin inserted in the bore, which is axially parallel to the column, may be shifted against a second spring, and a locking member laterally attached to the bore engages between the rear legs of the two gripper arms.

10 Claims, 3 Drawing Sheets

TOOL GRIPPER

BACKGROUND OF THE INVENTION

The invention relates to a tool gripper to remove and position a tool from or in a work spindle or a tool magazine.

In program-controlled milling and drilling machines and in machining centers as well, different tool changing systems are used to take-off the individual tools from the respective work spindle and to deposit them in a tool magazine positioned at a predetermined distance and vice versa. An important component of the various tool changing systems are the tool grippers, which have to provide for a safe hold of the possibly heavy tools when they are pulled off the spindle, when various transport movements are carried out, and also when the spindle is put in the predetermined position in the tool magazine. Therefore, known grippers regularly have motor-driven driving means for the opening and closing movements of the tong-like gripper arms which normally hold the arms at a bracing position which is sufficiently widely opened and, when the positioning on the tool has been carried out, provide a sufficiently powerful closing movement. A disadvantage of these operating devices which are mostly hydraulic cylinders is their complex structure and their susceptibility to trouble after prolonged use which could lead to an unintentional opening of the gripper arms during a transport movement under certain circumstances. Such a malfunction regularly results in switching-off the machine which involves the further danger that the expensive tools or the clamped work pieces, respectively, are damaged.

SUMMARY OF THE INVENTION

It is the object of the present invention to provide a tool gripper having a structure which is simpler and safer to function without electrical or hydraulic driving elements to actuate the same.

According to the invention this object is achieved in that a sufficiently rigid closing spring is clamped between the legs of the gripper arms which are positioned parallel to each other, and that the support is motor-driven movably mounted on a rod and has a pin inserted in a bore axially in parallel to the rod, which pin is moveable against a spring and has a locking member laterally formed on itself which engages between the rear legs of the two gripper arms formed as two arms.

In a particularly simple embodiment of the tool gripper according to the invention, the bolt being urged by the spring projects on one side beyond one face of the support and becomes abutted against a rigid component with this protruding end when the support carries out an axial feed motion. This rigid component may suitably contain a locking screw serving as a stop for the pin and pushing the locking member between the two legs of the gripper arms at the end of the feed motion of the support. Thus, a safe locking of the two gripper arms in their closing position is obtained.

According to another suitable embodiment of the invention, the disk-like locking member laterally fixed or formed, respectively, to the pin has laterally bevelled surfaces corresponding to laterally bevelled surfaces at the rear ends of the gripper arms. By a flat arrangement of these bevelled pairs of surfaces, a secure fixing of the two rear arm-legs and thus, a lock of the two gripper arms in the corresponding closing position is obtained.

BRIEF DESCRIPTION OF THE DRAWINGS

In the following, an embodiment of the invention is described in detail with reference to the drawings, wherein.

DESCRIPTION OF THE PREFERRED EMBODIMENTS

Figure 1:
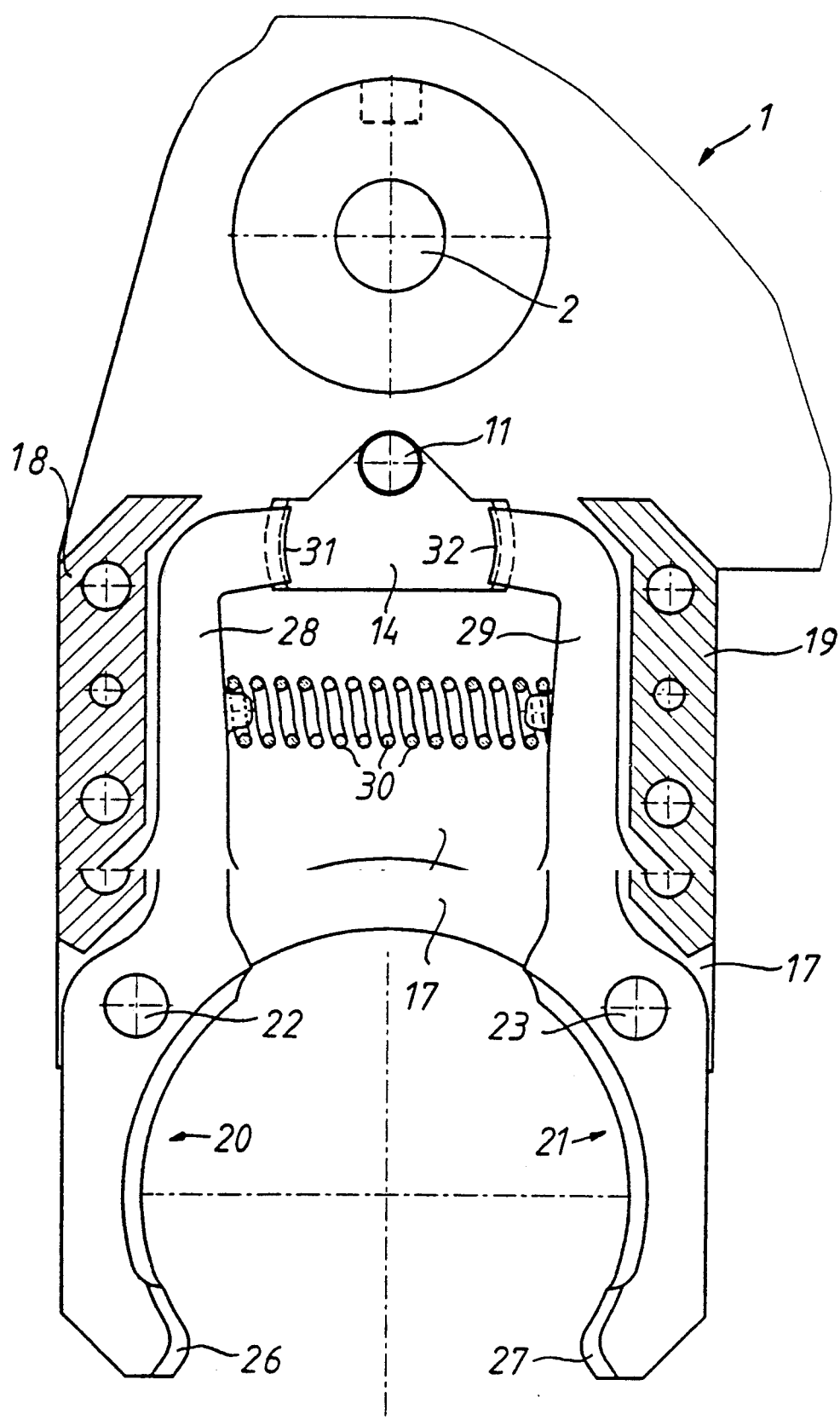
FIG. 1 is a top view of a tool gripper.

Referring now to FIGS. 1-4 in which like elements are provided having like designations throughout the several views, a tool gripper comprises a support 1 which is axially movably guided on a rod or a column 2, respectively. This column 2 is attached between the legs 3, 4 of a component 5 by means of two end journals, the component 5 being a constructional element of the tool changer and which may be designed rotatably around an axis-not shown. In this component 5 a cylinder 6 is arranged axially in parallel to the column 2, into the axial dead-ended bore 7 of which protrudes a guide pin 8. The broadened head of the guide pin 8 is fixed in a lower support part of the component 4. A driving pin 9 is laterally attached to the cylinder 6 which projects into a radial dead-ended recess in the hollow-cylindrical support 1. By an axial movement of the cylinder 6 relative to the component 5, the support 1 is axially shifted on the column 2 by means of the driving pin 9.

Figure 2:
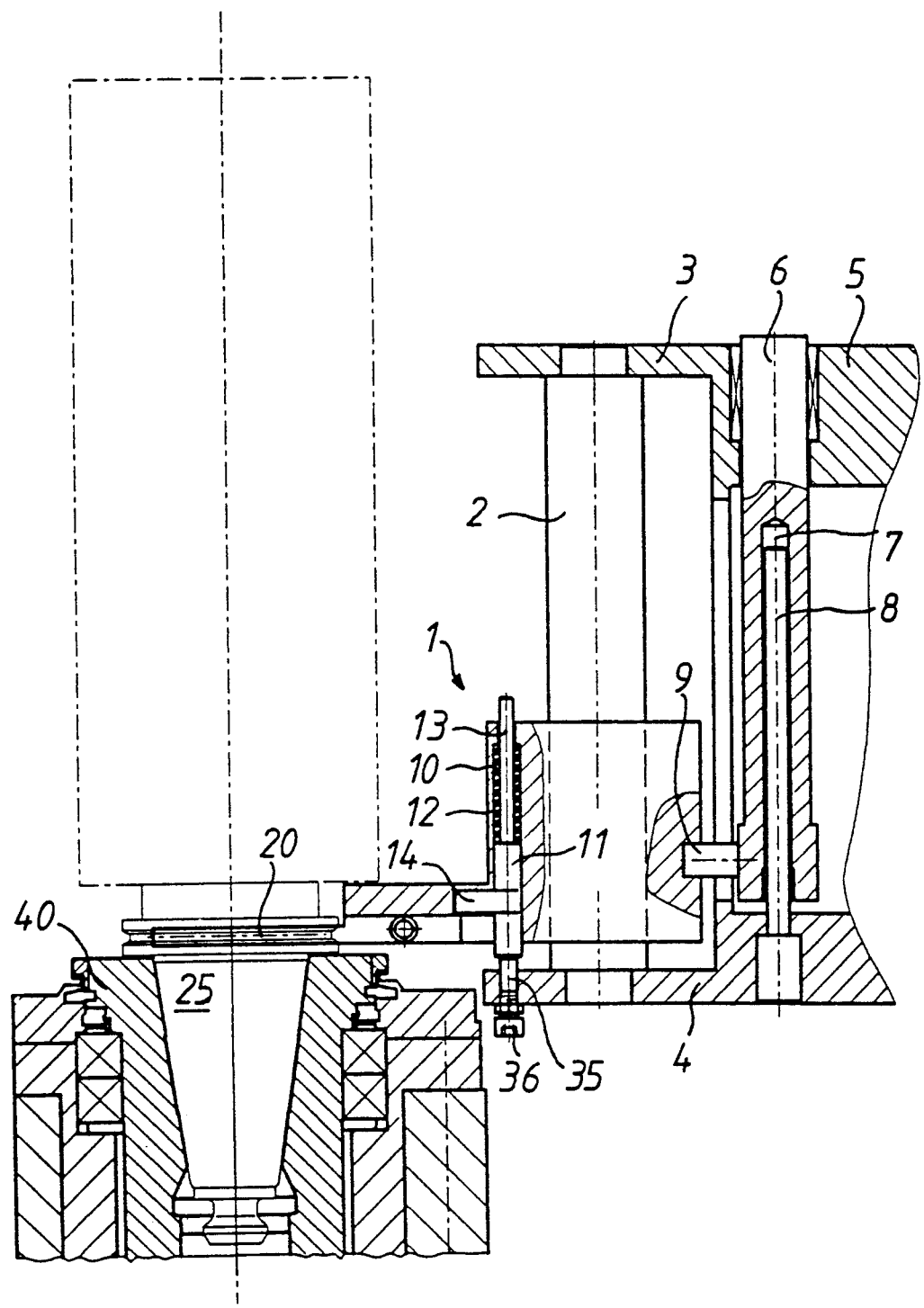
FIG. 2 shows an axial section of the tool gripper of FIG. 1 when in engagement with the ring groove of a clamped tool taper.
Figure 3:
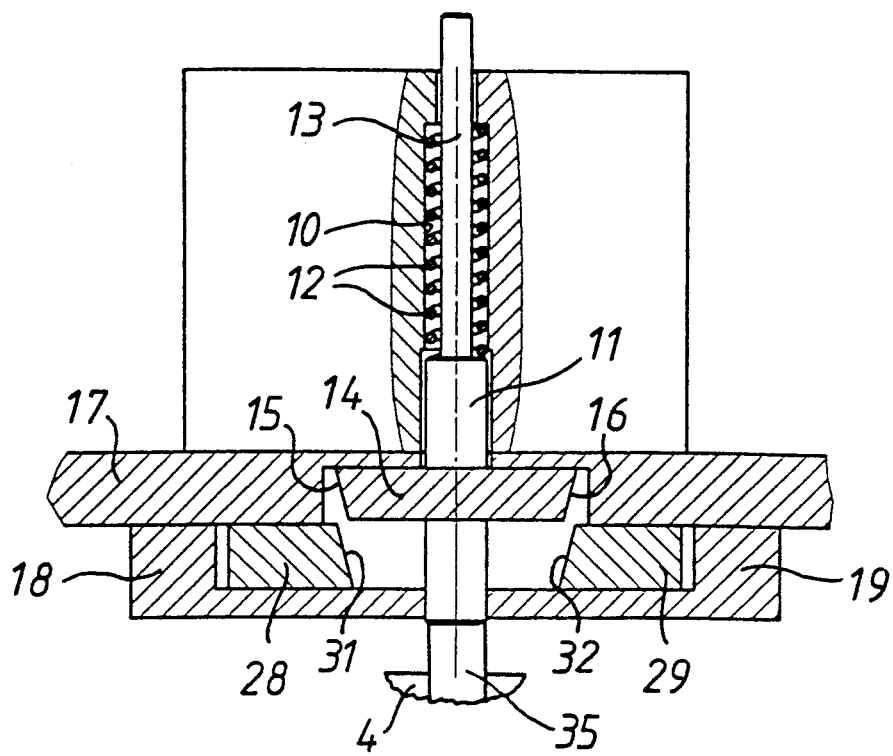
FIG. 3 shows the pin with locking member when disengaged.
Figure 4:
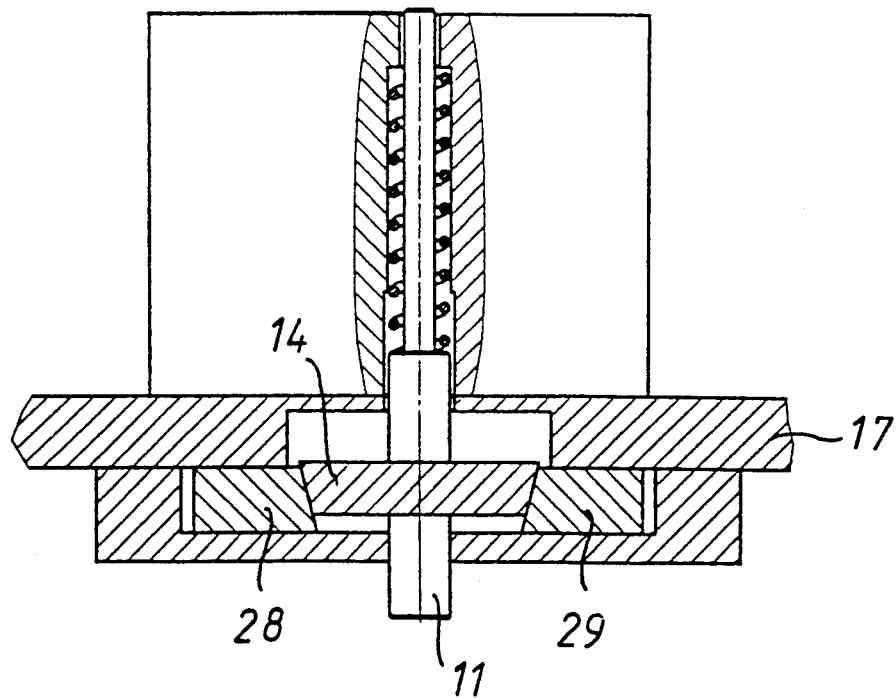
FIG. 4 shows the pin with locking member when locked.

As may be taken from FIG. 2, a bore 10 is provided in the support 1 diametrically opposite a driving pin 9 which is axially parallel displaced with respect to the column or the rod 2, respectively, in which bore an axially moveable pin 11 is received. A pressure spring 12 is clamped between an upper ring shoulder of the bore and a stop surface at the pin 11 encompassing the upper narrow pin section 13. When the force of this pressure spring is applied, the pin 11 is held in the closing position shown in FIG. 4. Approximately in the middle of the thickened section of the pin 11, a locking member 14 is formed having the form shown in FIG. 1 and having laterally bevelled surfaces 15, 16 according to FIGS. 3 and 4. Further, a laterally projecting receiving plate 17 is attached to the support 1 to which two lateral limiter webs 18, 19 of a lower plate are fixed. Further, in this receiving plate 17, a recess is provided which has approximately the form of the locking member 14 and serves to receive the locking member 14 when the pin 11 is pushed in (see FIG. 3). Two double-arm grippers 20, 21 in the receiving plate 17 are mounted swingably around hinge pins 22, 23, the front leg thereof having an inside contour like a segment of a circle for engagement with the receiving groove of a tool taper 25 shown in FIG. 2. Bracing noses 26, 27 with curved inner surfaces are formed at the front leg ends. The rear legs 28, 29 of the two gripper arms 20, 21 extend in parallel to each other and also in parallel to an imaginary connection line between the center axis of a tool 25 to be gripped and the center axis of the pin 15 and the column 2. Two journals are formed approximately in the middle section of these rear legs 28, 29 at the inner walls thereof which serve as holders for a rigid pressure spring 30. The end section of the two rear legs 28, 29 are bent to the inside by about 90 degrees and have bevelled lateral surfaces 31, 32 formed at their ends corresponding to the bevelled surfaces 15, 16 of the locking member 14 (see FIGS. 3, 4).

A protruding locking screw 35 is arranged in the middle axis of the pin 11 of the lower leg 4 of the component 5 which may be screwed by means of a head 36 more or less deep into a threaded bore in the leg 4, so that its protruding shank forms an adjustable stop for the lower thickened pin end.

The tool gripper described above functions as follows:

To grip the taper of a tool which is, for example, positioned in the work spindle or in the change position of a magazine, the tool changer (component 5) is laterally travelled to the tool taper 25 to be picked-up. During or shortly before this lateral movement, the support 1 is shifted from an upper position—not shown—into the position according to FIG. 2. During this shifting, the pin 11 is moved to sit close to the protruding part of the locking screw 35, so that the pin 11 is shifted by a predetermined value from its lower normal position according to FIG. 4 to its upper unlocking position according to FIG. 3. Thus, the locking member 14 becomes disengaged from the rear ends of the tong legs 28, 29. By lateral pushing-in movement of the tool changer, the curved bracing noses 26, 27 move into engagement with the receiving groove formed on the tool taper 25, with a bracing of both front legs of the tongs being performed against the power of the rigid spring 30 because of the curved form of these noses. This lateral movement is carried out until both front legs of the two gripper arms 20, 21, have safely encompassed the tool taper (position according to FIG. 2). By a renewed axial shifting of the support 1 performed by means of the cylinder 6 and its driving pin 9, the tool taper is pulled off axially from the work spindle 40 of the machine tool or the work piece holder of a magazine, respectively. At the beginning of this pulling-off movement, the pin shifts relative to the support 1 from the position according to FIG. 3 to the locking position according to FIG. 4, with the locking member entering between the bevelled side surfaces 31, 32 of the rear legs 28, 29 of the gripper arms and safely preventing a swinging motion of the two gripper arms, 20, 21 by abutting the respective wedge surfaces. This relative axial shifting of the pin 11 is carried out by the influence of the spring 12. For fixing a tool with tool taper 25 to the work spindle or a tool holder of the magazine, respectively, the different movements are performed in reverse sequence.

For the tool gripper according to the invention, it is essential that at the beginning of each axial shifting of the support an effective locking of the two gripper arms is performed by engaging the locking member 14 between the rear ends of the two gripper arms. This safe locking is constructionally simple and safe to function, since it is effected only by means of an adjustable stop 35 at the changer as well as the pin 11 with its locking member 14 and a simple pressure spring. Additional control elements for actuating the two gripper arms 20, 21 are not required.

The present invention is not limited to the presented embodiment. In particular, to shorten the change times by a rotation about an axis—not shown—, two tool grippers may be mounted on the component 5 diametrically opposite to each other or mutually offset by 90 degrees.

What is claimed is:

1. A tool gripper for taking off a tool from and clamping a tool in a work spindle or a tool magazine, said tool gripper comprising:
    two tong-like gripper arms (20, 21);
    a support (1) attached to a tool changer (5) on which the two gripper arms are mutually swingably mounted;
    an operating device to open and close the two gripper arms, said operating device comprising a spring (30) clamped between two rear legs (28, 29) arranged opposite each other and approximately in parallel with the gripper arms (20, 21) wherein the support (1) is motor-driven movably arranged on a column (2) and has a pin inserted in a bore (10) which is axially in parallel to the column (2), which pin is moveable against a spring (12) and has a locking member laterally formed on itself engaging between the rear legs (28, 29) of the two gripper arms (20, 21);
    wherein the pin (11), being urged by the spring (12), projects on one side beyond one face of the support and is moveable against the power of the spring (12) by abutting against a stop (35) when the support (1) is axially shifted; and
    wherein a locking screw (35, 36) disposed in a component (4, 5) of the tool changer is provided as the stop for the pin (11).

2. The tool gripper according to claim 1, wherein the locking member (14) laterally fixed to the pin (11) has laterally bevelled surfaces (15, 16) which correspond to bevelled side surfaces (31, 32) at the rear ends of the rear legs (28, 29) of the two gripper arms.

3. The tool gripper according to claim 2, wherein the front legs of the two gripper arms have curved bracing noses (26, 27) at their ends.

4. A tool gripper for taking off a tool from and clamping a tool in a work spindle or a tool magazine, said tool gripper comprising:
    a tool changer (5) having a first leg and a second leg;
    a column having a first end coupled to the first leg of the tool changer and a second end coupled to the second end of the tool changer;
    a support (1), having a bore (10) therein, movably disposed about the column wherein said support is coupled to said tool changer (5);
    two tong-like gripper arms (20, 21) each of said tong-like gripper arms having a rear leg mutually swingably mounted on said support (1); and
    an operating device to open and close the two gripper arms, wherein said operating device comprises:
        a first spring (30) disposed between the rear legs (28, 29) of said gripper arms wherein said rear legs are arranged to each other approximately in parallel with the gripper arms (20, 21);
        a second spring (12) disposed in the bore of the support; and
        wherein the support (1) is motor-driven on the column (2) and has a pin inserted in the bore (10), wherein the pin is moveable against the second spring (12) and has a locking member laterally formed on itself engaging between the rear legs (28, 29) of the two gripper arms (20, 21).

5. The tool gripper according to claim 4, wherein the pin (11), being urged by the second spring (12), projects on one side beyond one face of the support and is moveable against the force of the second spring (12) by abutting against a stop (35) when the support (1) is shifted in an axial direction.

6. The tool gripper according to claim 5, wherein said stop comprises a locking screw (35) disposed in a first one of the first and second legs of the tool changer.

7. The tool gripper according to claim 6, wherein the locking member (14) laterally fixed to the pin (11) has laterally bevelled surfaces (15, 16) which correspond to bevelled side surfaces (31, 32) at the rear ends of the rear legs (28, 29) of the two gripper arms.

8. The tool gripper according to claim 7, wherein each of said two gripper arms include a front leg having curved bracing noses (26, 27) at a first end thereof.

9. A tool gripper for taking off a tool from and clamping a tool in a work spindle or a tool magazine, said tool gripper comprising:
    a tool changer;
    a column;
    a motor driven support having a bore along a longitudinal axis thereof and axially parallel to said column, said support arranged on said column and coupled to said tool changer;
    a pair of gripper arms swingably coupled to said support, each of said gripper arms having a first end for gripping and a second end;
    an operating device to open and close the pair of gripper arms, said operating device comprising a first pressure spring coupled between the second end of said pair of gripper arms;
    an axially moveable pin disposed in said bore, said pin having a first end and a second end and a stop surface disposed between the first end and second end;
    a second pressure spring disposed between a shoulder of the bore and the stop surface of the pin wherein the pin is moveable in response to a force provided by the second pressure spring;
    a locking member coupled to said pin, said locking member engageable between the second ends of the pair of gripper arms in response to the pin being urged by the second pressure spring; and
    an adjustable stop coupled to a second end of said pin, said adjustable stop for defining a predetermined distance over which the pin may move in a longitudinal direction in the bore.

10. The tool gripper of claim 9 wherein the adjustable stop for the pin comprises a locking screw disposed in a component of the tool changer.

* * * * *